E. MORELLI.
SPARK AND THROTTLE CONTROL MECHANISM.
APPLICATION FILED JULY 17, 1916.
1,203,232.
Patented Oct. 31, 1916.
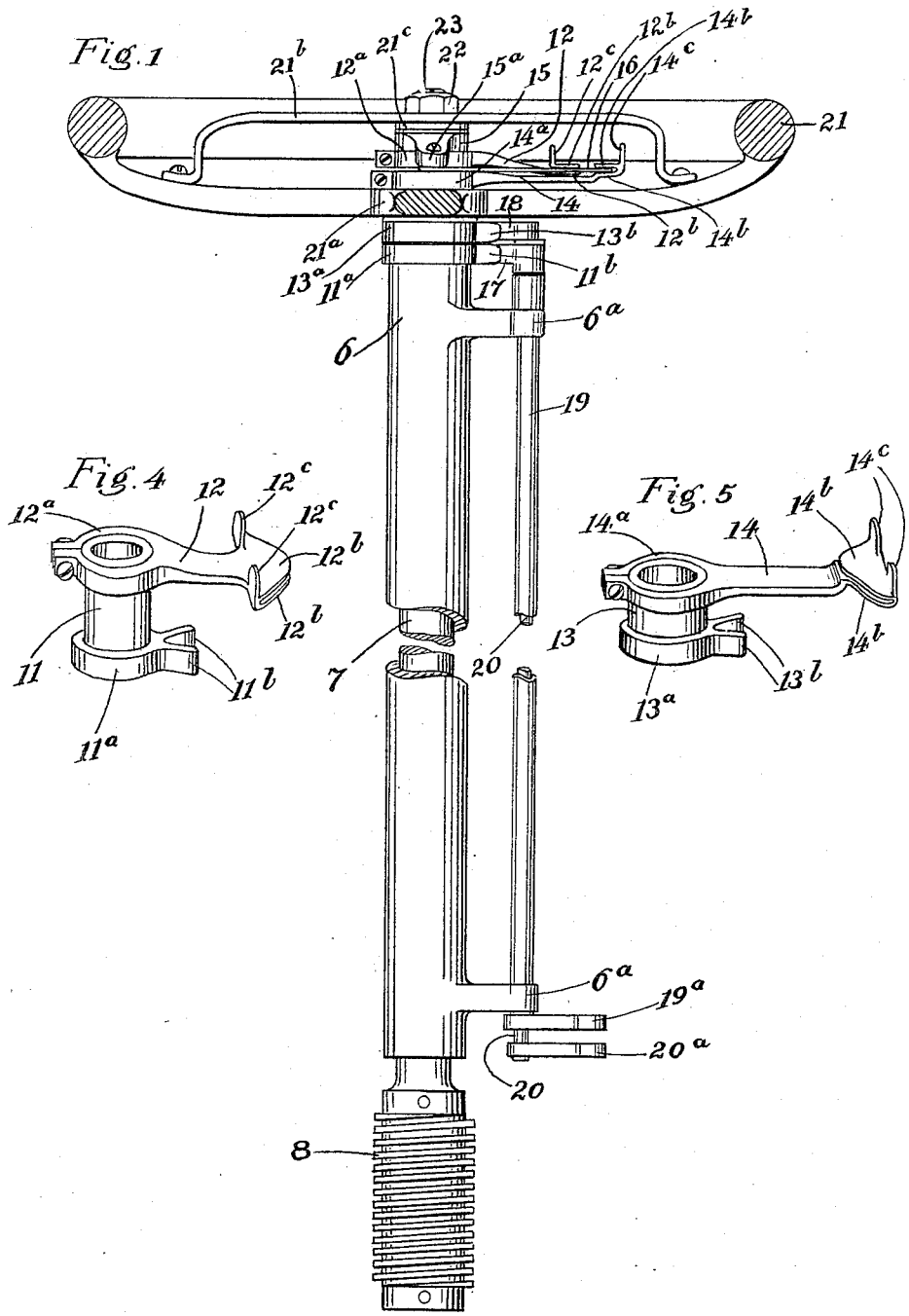
Inventor
Enrico Morelli E. MORELLI.
SPARK AND THROTTLE CONTROL MECHANISM.
APPLICATION FILED JULY 17, 1916.
1,203,232.
Patented Oct. 31, 1916.
2 SHEETS—SHEET 2.
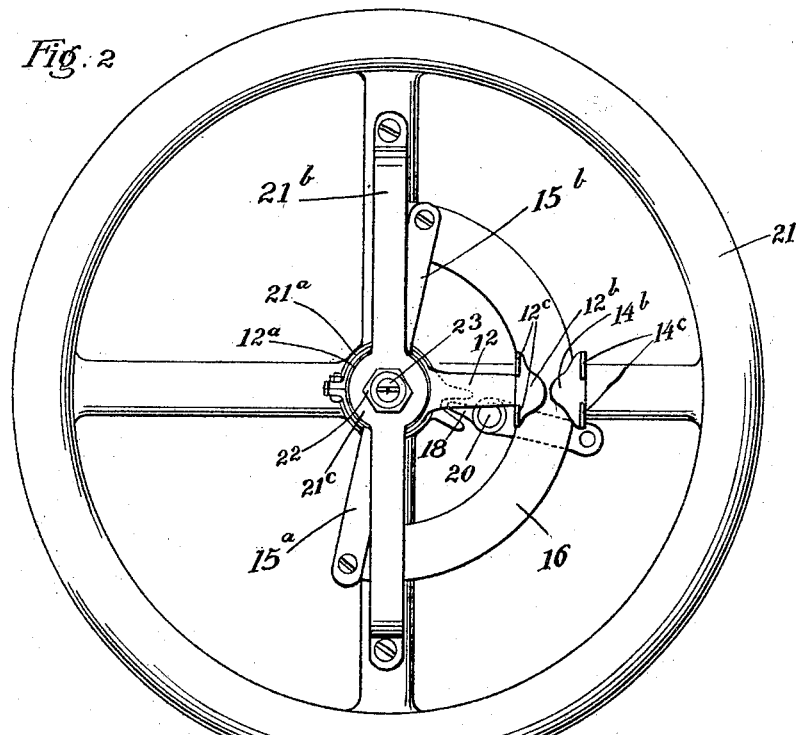
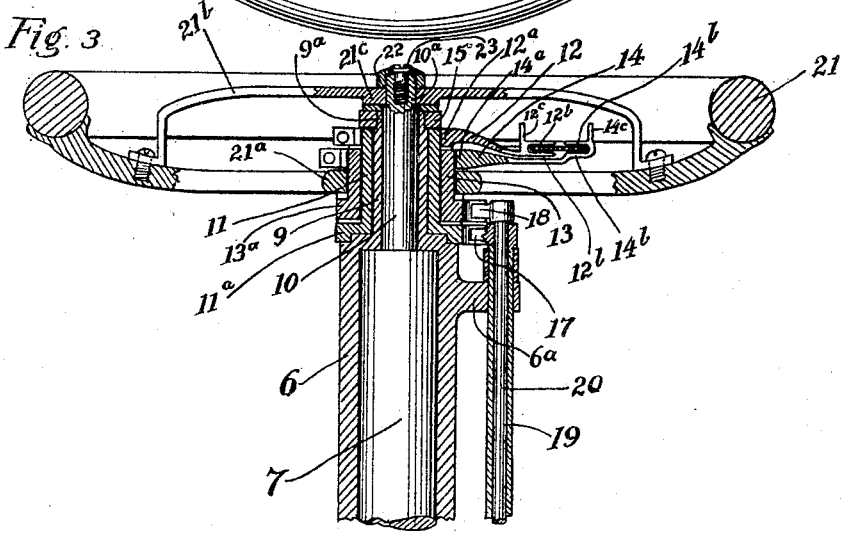
Inventor
Enrico Morelli

UNITED STATES PATENT OFFICE.

ENRICO MORELLI, OF CINCINNATI, OHIO, ASSIGNOR OF ONE-HALF TO DOMENICO VENOSA, JR., OF CINCINNATI, OHIO.

SPARK AND THROTTLE CONTROL MECHANISM.

1,203,232.  Specification of Letters Patent.  Patented Oct. 31, 1916.

Application filed July 17, 1916. Serial No. 109,690.

*To all whom it may concern:*

Be it known that I, ENRICO MORELLI, a subject of the King of Italy, residing in Cincinnati, in the county of Hamilton and State of Ohio, have invented new and useful Improvements in Spark and Throttle Control Mechanism, of which the following is a specification.

This invention relates to an improved spark and throttle control mechanism for automobiles and particularly to that portion of the spark and throttle control mechanism located on the steering column.

An object of my invention is to produce a spark and throttle control mechanism which is simpler than other mechanisms known to me and in which the operating elements thereof are located externally of the steering column, thereby rendering it capable of repair without dismantling the steering column. This and other objects are attained in the mechanism described in the following specification and illustrated in the accompanying drawings and in which—

Figure 1 is an elevational view of a steering column having a spark and throttle control mechanism embodying my invention attached thereto, certain portions being broken away for convenience of illustration. Fig. 2 is a plan view of the steering column and control mechanism illustrated in Fig. 1. Fig. 3 is a fragmental longitudinal sectional view of the steering column and control mechanism illustrated in Figs. 1 and 2. Figs. 4 and 5 are perspective views of the spark and throttle control levers of the mechanism embodying my invention.

My improved control mechanism is shown mounted on a steering column having certain features in common with automobile design, viz. a stationary tube 6 forming a casing for a shaft 7 passing therethrough and provided for rotating the worm 8 forming a portion of the steering mechanism. The upper end of the tubular member 6 is constricted and is provided with a portion 9 in which is rotatively mounted an extension 10 of the steering shaft 7. Rotatively mounted on the extension 9 is a sleeve 11 carrying an arm clamped thereto as disclosed in Figs. 1 and 4, which is provided for the purpose of rotating the sleeve on the extension 9. Rotatively mounted on the sleeve 11 is a second sleeve 13 which carries an arm 14 provided for effecting its rotation. Sleeve 13 is of necessity somewhat shorter than sleeve 11 because of its occupying the space between the collar $12^a$ of the arm 12 and a flange $11^a$ of the sleeve 11. The arm 14 is also provided with a collar $14^a$ which embraces the sleeve 13 and is secured thereto in the same manner as the collar $12^a$. The sleeve 13 is also provided with a flange $13^a$ at its lower end and which rests upon the flange $11^a$ of the sleeve 11.

At the extreme upper end of the extension 9 of the casing 6 is formed a squared portion $9^a$ upon which is mounted a member 15 which has arms $15^a$ and $15^b$ extending to each side of the center thereof. The ends of these arms are connected by screws or other suitable fastening means to the ends of a segment 16. This segment is concentric with the axis of the steering column so that when the arms 12 and 14 are moved to rotate the sleeves 11 and 13, the ends will coincide with the inner and outer peripheries of the segment 16. These ends are forked as shown in Figs. 3, 4 and 5, the branches $12^b$ of the fork of arm 12 embracing the inner periphery and portions of the top and bottom surfaces adjacent to the inner periphery of the segment, the branches $14^b$ of the fork of arm 14 engaging the outer periphery and surfaces adjacent to the outer periphery of the segment. The forks are provided for preventing displacement of the ends of the arms from the segment and also for providing frictional means if desired in order to prevent displacement of the arms from their adjusted positions. Extending upwardly from the upper branches $12^b$ and $14^b$ are lugs $12^c$ formed on the arm 12 and lugs $14^c$ formed on the arm 14, these lugs being preferably formed in pairs and spaced apart so as to provide handles for operating the arms. The purpose of spacing the lugs apart will be hereinafter more fully set forth.

On the flanges $11^a$ and $13^a$ of the sleeves 11 and 13 are formed the respective teeth $11^b$ and $13^b$, which teeth are located adjacent to one another to form forks adapted to receive the respective fingers 17 and 18 mounted in turn on a sleeve 19 and a shaft 20 extending longitudinally of and parallel with the casing 6, the shaft 20 being located within the sleeve 19 to operate concentrically therewith. The sleeve 19 is rotatively mounted in turn in bearings $6^a$ on the casing 6. The lower ends of the sleeve 19 and shaft 20 are provided with the respective fingers 19ª and 20ª to which are connected in any suitable manner the usual throttle and spark mechanisms, either finger being employed for controlling either the spark or the throttle.

In the space between the flange 13ª and the collar 14ª is located the hub 21ª of the steering wheel 21, it being rotatively mounted on the sleeve 13 at this point. This is for the purpose of permitting operation of the steering wheel. However in order to operatively connect the steering wheel with the steering shaft 7, a yoke 21ᵇ which extends from arm to arm of the spider of the steering wheel is provided. The ends of the yoke are secured in any suitable manner to the arms of the steering wheel and the center of the boss 21ᶜ of the yoke is provided with an angular opening for engaging the correspondingly shaped upper end 10ª of the steering shaft extension 10 thus provided for rotation of the steering shaft from the steering wheel. In order to secure the steering wheel and yoke against relative movement on the shaft 7 and to hold the boss 21ᶜ in engagement with the shoulder formed between the extension 10 and its angular upper end 9ª, I have provided a nut 22 which is mounted on screw threads formed on the upper end of the extension 10ª. In addition to this I have provided a screw 23 which engages an interiorly threaded recess in the extension 10ª and which coöperates with a washer provided for locking the nut 22 in its tightened position.

In using the improved throttle and spark control mechanism embodying my invention either of the arms 12 or 14 may be employed in controlling the spark and throttle of the automobile. It will be seen that when the yoke 21ᵇ is in position to prevent ready access to the handles afforded by the lugs 12ᶜ and 14ᶜ of the levers 12 and 14, these lugs being spaced apart will permit of the arms being operated from either side of the yoke 21ᵇ, the spaces between the lugs being such that if one of the lugs 12ᶜ or 14ᶜ be obstructed, the other will be accessible for the operation of its respective arm. It will also be seen that by means of my improved mechanism I have provided a construction which does not necessitate dismantling the steering column in order to reach the operating portion thereof, as is necessitated in throttle and spark control mechanisms now employed and which are located entirely within the steering column.

Having thus described my invention what I claim is:—

1. A spark or throttle control mechanism for attachment to the steering column of an automobile, comprising a toothed collar rotatively mounted on a stationary member of the steering column, a segment concentric with the axis of the collar, said collar having an arm embracing the segment and a forked end for the operation thereof, and a control lever having a finger for engagement with the teeth of said collar.

2. In a spark or throttle control mechanism for attachment to the steering column of an automobile, the combination of a toothed collar rotatively mounted on a member of the steering column, a segment concentric with the axis of the collar and mounted to be stationary with relation thereto, an arm extending from the collar and having a forked end embracing the segment and providing a handle therefor, and a control lever having a finger for engagement with the teeth of said column.

3. In combination in a spark or throttle control mechanism for attachment to the steering column of an automobile, a forked collar rotatively mounted on a relatively stationary member of the steering column, a segment concentric with the axis of the collar, an arm extending from the collar, said collar having a forked end embracing the segment and providing a plurality of handles, and a control lever having a finger embraced by the fork of the collar.

In testimony whereof, I affix my signature in the presence of two witnesses.

ENRICO MORELLI.

Witnesses:
C. M. BECHTEL,
CHAS. R. BUSCHMAN.

Copies of this patent may be obtained for five cents each, by addressing the "Commissioner of Patents, Washington, D. C."